(No Model.)
A. O. HALL.
Game.
No. 237,012. Patented Jan. 25, 1881.
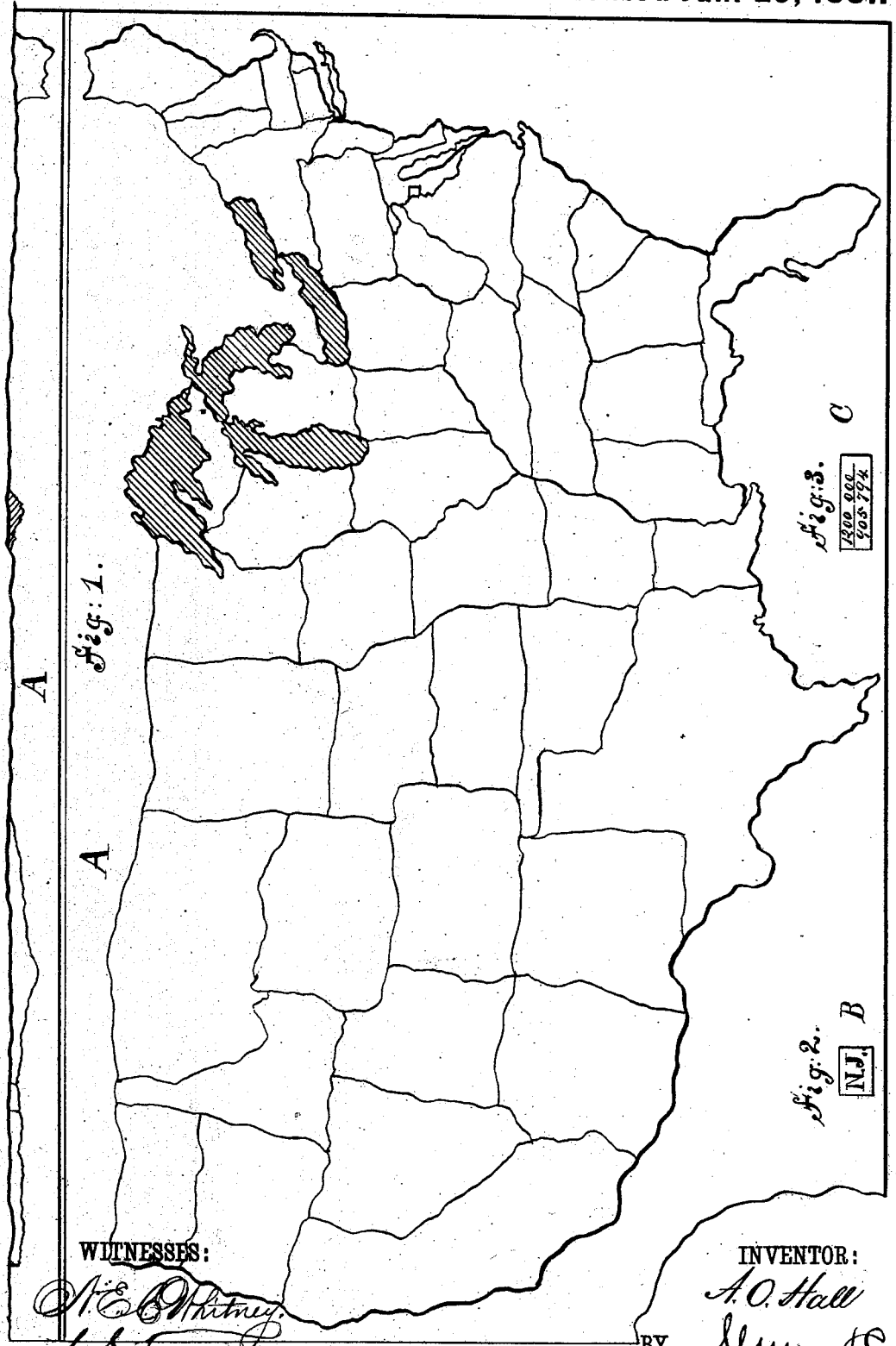
WITNESSES:
N. E. C. Whitney
C. Sedgwick
INVENTOR:
A. O. Hall
BY Munn & Co
ATTORNEYS.

UNITED STATES PATENT OFFICE.

ALVIN O. HALL, OF CINCINNATI, OHIO.

GAME.

SPECIFICATION forming part of Letters Patent No. 237,012, dated January 25, 1881.

Application filed December 21, 1880. (No model.)

*To all whom it may concern:*

Be it known that I, ALVIN O. HALL, of Cincinnati, Hamilton county, State of Ohio, have invented a new and Improved Game, of which the following is a specification.

The object of my invention is to provide a new and improved game which requires the player to acquire a knowledge of the census reports and of the outlines of the States and countries, as they are the essential requirements in playing this game, whereby the memory is greatly improved.

The invention consists in one or two outlined maps of country or a number of States and of a series of blocks having the names of the corresponding countries, States, or counties printed thereon, and of a series of blocks having the number of inhabitants of the corresponding countries, States, or counties printed thereon.

In the accompanying drawings, Figure 1 is a view of one of the maps that forms part of my improved game. Fig. 2 is a plan view of one of the blocks with the name of a State printed thereon; and Fig. 3 is a plan view of one of the blocks with the number of inhabitants in a State printed thereon.

Similar letters of reference indicate corresponding parts.

A map, A, of a country, State, county, &c., showing the subdivisions in outline, forms the board upon which the game is played, two maps, A, being hinged to each other, as there are two players. One board would answer, but two are more convenient.

The game is played with a number of blocks or strips, B, each having the name of a different subdivision of the map A printed thereon. There are as many blocks or strips B as there are subdivisions on the map, and in this case, as the map of the United States is shown, forty-eight blocks will be required, as there are forty-eight subdivisions, viz., thirty-eight States, nine territories, and one district. To play the game a like number of strips or blocks, C, are required, these blocks having the number of inhabitants in the State at the last census printed thereon, or the number of inhabitants at the last and at the preceding census may be printed thereon.

The game is played as follows: It can be played in two different manners, which shall both be described.

Two players are required, and they begin by turning down all the blocks or strips B. Either player, for instance No. 1, turns up a block, B, so that the name of the State can be seen, and then both guess at the population in 1880, and the one that has nearest approached the true figure takes the block and places it upon the corresponding State, and if he fails the block is returned to the rest; but if he has guessed correctly the block remains on his map until all the blocks have been placed upon the map, the player having the most blocks on his map being the winner. The maps are not provided with the names of the subdivisions, and the players are only guided by the shape and location of the subdivisions.

A referee, who is provided with a census list containing the subdivisions arranged according to the number of inhabitants, decides all questions in regard to the guessing.

If played with the strips or blocks C the game is similar. The strips C are all placed on a table, or on the map A, face downward, and one player turns up one of the strips so that the figures can be seen, and names the subdivision to which it belongs, and if he is correct places it upon the subdivision it belongs to on his map; but if he does not guess correctly, or misplaces the strip, the same is returned to the box, or the next player may guess, according to agreement. The player having most strips on his map after all the strips have been placed upon the map is the winner.

It is evident that persons playing this game will easily acquire perfect knowledge of the census figures of countries, States, and counties in a very simple and convenient manner, and at the same time will become acquainted with the political subdivisions of countries, and it is well adapted for the cultivation of the memory.

Having thus described my invention, I claim as new and desire to secure by Letters Patent—

1. The within-described game-board consisting of a map showing the political subdivisions in outline, substantially as herein shown and described, and for the purpose set forth.

2. In a game, the combination, with the map A, of the blocks B, having the names of the subdivisions of the map printed thereon, and of the strips C, having the population of these subdivisions printed thereon, substantially as herein shown and described, and for the purposes set forth.

ALVIN O. HALL.

Witnesses:
OSCAR F. GUNZ,
C. SEDGWICK.